(12) United States Patent
Jiang et al.

(10) Patent No.: US 6,631,392 B1
(45) Date of Patent: Oct. 7, 2003

(54) METHOD AND APPARATUS FOR PREDICTING FLOATING-POINT EXCEPTIONS

(75) Inventors: XingYu Jiang, San Jose, CA (US); Ying-wai Ho, Los Altos, CA (US); John L. Kelley, San Francisco, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 0 days.

(21) Appl. No.: 09/363,638

(22) Filed: Jul. 30, 1999

(51) Int. Cl.$^7$ ................................................ G06F 7/38

(52) U.S. Cl. .................................... 708/498; 708/505

(58) Field of Search ........................... 708/525, 552, 708/553, 495, 498, 505

(56) References Cited

U.S. PATENT DOCUMENTS

| | | | |
|---|---|---|---|
| 4,156,279 A | 5/1979 | Wilhite | |
| 4,511,990 A | 4/1985 | Hagiwara et al. | ........... 364/748 |
| 4,839,846 A | 6/1989 | Hirose et al. | |
| 4,866,652 A | 9/1989 | Chu et al. | |
| 4,879,676 A | 11/1989 | Hansen | ........................ 364/748 |
| 5,025,407 A | 6/1991 | Gulley et al. | |
| 5,038,313 A | 8/1991 | Kojima | |
| 5,159,665 A | 10/1992 | Priem et al. | |
| 5,185,713 A | 2/1993 | Kobunaya | ................... 364/748 |
| 5,206,823 A | 4/1993 | Hesson | |
| 5,220,524 A | 6/1993 | Hesson | |
| 5,257,216 A * | 10/1993 | Sweedler | ................. 340/146.2 |
| 5,278,949 A | 1/1994 | Thayer | |
| 5,341,321 A | 8/1994 | Karp et al. | |
| 5,357,599 A | 10/1994 | Luken | |
| 5,359,548 A | 10/1994 | Yoshizawa et al. | |
| 5,367,650 A | 11/1994 | Sharangpani et al. | |
| 5,392,228 A | 2/1995 | Burgess et al. | ........ 364/715.04 |
| 5,420,966 A | 5/1995 | Silverbrook | |
| 5,420,971 A | 5/1995 | Westerink et al. | |
| 5,511,016 A | 4/1996 | Béchade | |
| 5,517,438 A | 5/1996 | Dao-Trong et al. | ......... 364/748 |

(List continued on next page.)

OTHER PUBLICATIONS

Hajime, et al., "A 2.5 GFLOPS 6.5 Million Polygons per Second, Four–Way VLIW Geometry Processor with SIMD Instructions and a Software Bypass Mechanism," *IEEE Journal of Solid–State Circuits*, vol. 34, No. 11, IEEE (Nov. 1999) pp. 1619–1626 (corresponding to Paper No. 15.3, Higaki, et al., "A 2.5 GFLOPS 6.5 Million Polygons per Second 4–Way VLIW Geometry Processor with SIMD Instructions and a Software Bypass Mechanism," *1999 IEEE International Solid–State Circuits Conference*, San Francisco, CA, Feb. 15–17, 1999).

(List continued on next page.)

*Primary Examiner*—Chuong Dinh Ngo
(74) *Attorney, Agent, or Firm*—Sterne, Kessler, Goldstein & Fox P.L.L.C.

(57) ABSTRACT

A method and apparatus predict whether an overflow or underflow floating-point exception could occur as a result of a data processing system performing a particular floating-point operation. Predictions are made based on at least one overflow threshold value, at least first and second underflow threshold values, and a preliminary result exponent value derived from the values of the exponents of the floating-point numbers that are about to be acted upon. The preliminary result exponent is compared to an overflow or underflow threshold value in order to predict whether there is a possibility that an overflow or underflow floating-point exception could occur. Overflow and underflow exceptions are predicted and an exception prediction signal is generated. The exception prediction signals that are generated may be used by data processing system control units, for example, to temporarily halt any parallel processing operations that may be affected by an overflow or underflow floating-point exception.

54 Claims, 4 Drawing Sheets

U.S. PATENT DOCUMENTS

| | | |
|---|---|---|
| 5,530,663 A | 6/1996 | Garcia et al. |
| 5,550,767 A | 8/1996 | Taborn et al. |
| 5,550,768 A | 8/1996 | Ogilvie et al. .............. 364/748 |
| 5,553,015 A | 9/1996 | Elliott et al. |
| 5,602,769 A | 2/1997 | Yu et al. |
| 5,631,859 A | 5/1997 | Markstein et al. |
| 5,652,875 A | 7/1997 | Taylor |
| 5,671,170 A | 9/1997 | Markstein et al. |
| 5,671,401 A | 9/1997 | Harrell ....................... 395/505 |
| 5,701,442 A | 12/1997 | Ronen |
| 5,720,019 A | 2/1998 | Koss et al. |
| 5,726,927 A | 3/1998 | Wolrich et al. ............. 364/754 |
| 5,729,724 A | 3/1998 | Sharangpani et al. ....... 395/563 |
| 5,768,170 A | 6/1998 | Smith |
| 5,774,709 A | 6/1998 | Worrell ...................... 395/580 |
| 5,790,827 A | 8/1998 | Leung ........................ 395/392 |
| 5,793,661 A | 8/1998 | Dulong et al. |
| 5,805,486 A | 9/1998 | Sharangpani |
| 5,809,294 A | 9/1998 | Ando |
| 5,815,695 A | 9/1998 | James et al. |
| 5,847,979 A | 12/1998 | Wong et al. |
| 5,848,269 A | 12/1998 | Hara |
| 5,852,726 A | 12/1998 | Lin et al. |
| 5,867,682 A | 2/1999 | Witt et al. |
| 5,880,983 A | 3/1999 | Elliott et al. |
| 5,880,984 A | 3/1999 | Burchfiel et al. |
| 5,889,690 A | 3/1999 | Arakawa |
| 5,892,698 A | 4/1999 | Naffziger |
| 5,901,076 A | 5/1999 | Lynch |
| 5,923,577 A | 7/1999 | Wong et al. |
| 5,928,316 A | 7/1999 | Wong et al. |
| 5,953,241 A | 9/1999 | Hansen et al. |
| 5,995,122 A | 11/1999 | Hsieh et al. |
| 5,996,066 A | 11/1999 | Yung |
| 5,999,960 A | 12/1999 | Gerwig et al. |
| 6,035,316 A | 3/2000 | Peleg et al. |
| 6,065,115 A | 5/2000 | Sharangpani et al. |
| 6,169,554 B1 | 1/2001 | Deering |
| 6,175,370 B1 | 1/2001 | Kunimatsu |
| 6,175,851 B1 | 1/2001 | Iourcha et al. |
| 6,199,089 B1 | 3/2001 | Mansingh |
| 6,249,798 B1 | 6/2001 | Golliver et al. |
| 6,268,875 B1 | 7/2001 | Duluk, Jr. et al. |
| 6,275,838 B1 | 8/2001 | Blomgren et al. |
| 6,285,378 B1 | 9/2001 | Duluk, Jr. |
| 6,285,779 B1 | 9/2001 | Lapidous et al. |
| 6,426,746 B2 | 7/2002 | Hsieh et al. |
| 6,510,446 B1 | 1/2003 | Fukagawa |

OTHER PUBLICATIONS

Hughes, J.K., *PL/I Programming*, John Wiley & Sons, Inc., pp. 5, 15–16, 74–75, 188–189, 327, 411–416, 423–424, and 689–690 (1973).

Heinrich, Joe, *MIPS R4000 Microprocessor User's Manual*, Second Edition, MIPS Technologies, 1994, pp. 154–155, 157, 159, 161, 168, 170–171, B–9, B–10, B–13, B–17, B–19, B–21, B–23, B–27, B–38, B–40 and B–62 (19 pages total). Note: The page count of this document was cited to us as listed here in an International Search Report from a MIPS PCT application.

*AltiVec ® Technology Programming Environments Manual*, Preliminary REV 0.2, May 1998, pp. 4–16 thru 4–19 (4 pages total).

American National Standards Institute, An American National Standard—*IEEE Standard for Binary Floating–Point Arithmetic*, (IEEE Std 754–1985), New York, New York, © 1985, pp. I–vi and 1–14.

*3DNow!™ Technology Manual*, Advanced Micro Devices, 1998, pp. I–x and 1–62 (72 pages total).

*TMS32010 User's Guide*, Texas Instruments, 1983, p. 1183.

Copy of the International Search Report for PCT Application No. PCT/US00/03900, 6 pages, Mailed Jul. 20, 2000.

American National Standards Institute, *An American National Standard—IEEE Standard for Binary Floating–Point Arithmetic*, (IEEE Std 754–1985), New York, New York, ® 1985, pp. i–vi and 1–14.

"MIPS Extension for Digital Media with 3D", MIPS Technologies, Inc., pp. 1–26 (Mar. 1997).

"MIPS IV Instruction Set", Revision 3.2, MIPS Technologies, Inc., pages B–21, B–22, B–26, B–47, B–48, B–49, B–63, B–81, B–84, B–88, B–96 (Sep. 1995).

"MIPS V Instruction Set", Revision 1.0, MIPS Technologies, Inc., pages B–1–B–37 (1996).

Thekkath et al., "An Architecture Extension for Efficient Geometry Processing", pp. 1–23, Presented at Hot Chips 11, A Symposium of High–Performance Chips, Stanford University (Aug. 1999) (Submitted for conference review Jul. 14, 1999).

Ito, M. et al., "Efficient Initial Approximation for Multiplicative Division and Square Root by a Multiplication with Operand Modification", *IEEE Transactions on Computers 46(4)*: 495–498, IEEE (Apr. 1997).

Higaki, et al., "A 2.5 GFLOPS 6.5 Million Polygons per Second 4–Way VLIW Geometr Processor with SIMD Instructions and a Software Bypass Mechanism," 1999 IEEE International Solid–State Circuits Conference, Paper No. 15.3, 11 pages, IEEE, San Francisco, CA, Feb. 15–17, 1999.

Sweetman, D., *See MIPS Run*, D. Penrose, Ed., Morgan Kaufmann Publishers, Inc., San Francisco, CA, pp. 91–114 and 149–173 (1999).

Uhler, M., "Optimizing Game Applications for the MIPS RISC Architecture", 1999 Computer Game Developer's Conference, San Jose, California, 14 pages (Mar. 1999 Submitted for conference review Feb. 12, 1999).

Uhler, M., "Optimizing Game Applications for the MIPS RISC Architecture", 1999 Computer Game Developer's Conference, San Jose, California, slides 1–22 (Mar. 1999).

\* cited by examiner

METHOD AND APPARATUS FOR PREDICTING FLOATING-POINT EXCEPTIONS

CROSS-REFERENCE TO RELATED PATENT APPLICATIONS

The following commonly owned and related applications are hereby incorporated by reference in their entirety for all purposes:

U.S. patent application Ser. No. 09/363,637, filed Jul. 30, 1999;

U.S. patent application Ser. No. 09/364,514, filed Jul. 30, 1999;

U.S. patent application Ser. No. 09/364,787, filed Jul. 30, 1999;

U.S. patent application Ser. No. 09/364,786, filed Jul. 30, 1999;

U.S. patent application Ser. No. 09/364,789, filed Jul. 30, 1999; and

U.S. patent application Ser. No. 09/364,512, filed Jul. 30, 1999.

BACKGROUND OF THE INVENTION

1. Field of the Invention

The invention is directed generally to a data processing apparatus having some form of parallel or pipelined architecture and including a floating-point unit, and more specifically to a method and apparatus for predicting floating-point exceptions.

2. Related Art

Computing apparatuses today, particularly those for scientific and engineering uses, perform many computations using "floating-point" numbers. One advantage of floating-point numbers is that they allow computations where the range of the magnitude of the numbers is very large, larger than can be handled, for example, with fixed point numbers (except with great difficulty). Floating-point representation of numbers corresponds very closely to what is often termed "scientific notation," each being represented as the product of a normal number with a radix and an integer power of the radix. Thus, for example, a number might be represented as: $1.34700 \times 10^8$. The number 1.34700 is called the significand or mantissa, the number 10 is called the radix, and the number 8 is called the exponent.

While floating-point numbers and floating-point computations provide significant advantages over fixed-point numbers and fixed-point computations, using floating-point numbers and floating-point computations involves the added complication of handling floating-point exceptions. ANSI/IEEE Standard 754-1985, IEEE Standard for Binary Floating-Point Arithmetic, which is incorporated in its entirety herein by reference, lists five types of floating-point exception. These exceptions are: overflow, underflow, inexact, invalid operation, and divide by zero.

There exist today many well known methods and techniques for handling various floating-point exceptions; however, particular problems arise when floating-point computations are used in data processing systems capable of some form of parallel processing such as is found in pipelined architecture. A pipelined architecture usually encompasses processor designs in which multiple instructions are in various stages of execution, all at the same time.

When a floating-point instruction culminates in a floating-point exception, it is necessary to re-execute the instruction, but only after the operands are adjusted to avoid the exception occurring again. However, to re-execute the floating-point instruction, the data processing apparatus must be backed up, so to speak, which means that the results of any instructions executed, or partially executed, during the execution of the floating-point instruction must be saved until later, or thrown away. This, in turn, requires the state of the data processing apparatus to be returned to that originally encountered by the instruction.

The problem is exacerbated when different instructions require different execution times; that is, when certain instructions can be executed in two, four, or a small number of processor cycles of operation, whereas other instructions, particularly floating-point instructions, require many more processor cycles of operation to complete. In this case, a floating-point computation that results in an exception is more difficult to back out of. That is, it is more difficult to restore the state of the data processing apparatus to that originally encountered by the instruction in order to avoid the floating-point exception.

One simple solution to these problems would be to halt the processing of any subsequent instruction when a floating-point computation is first encountered, allowing only the floating-point computation to proceed. A check of the result can then be made to determine if an exception has occurred. If not, normal processing resumes. If an exception has occurred, the computation can be redone without having to flush the pipeline (i.e., to discard or store the results of the pipeline insofar as instructions following the floating-point instruction are concerned). The problem with this simple solution is that it can significantly degrade the performance of the data processing system.

What is, therefore, desired, is a method and apparatus for predicting floating-point exceptions for a given floating-point computation before the floating-point computation is actually executed. Predicting floating-point exceptions for a given floating-point computation means determining whether the given floating-point computation could potentially result in a floating-point exception. If a given floating-point computation is predicted to result in an exception (that is, there is a possibility that an exception could occur), then the processor will halt the processing of any subsequent instructions. Otherwise, subsequent instructions are processed normally. One such method and apparatus for predicting floating-point exceptions is described in U.S. Pat. No. 4,879,676 to Hansen, which is incorporated in its entirety herein by reference.

Given today's ever-growing demands for faster and more powerful computing apparatuses, particularly by the scientific and engineering communities, there exists a need for even more accurate prediction of floating-point exceptions. It is, therefore, desirable to improve upon the method and apparatus disclosed in the Hansen patent.

SUMMARY OF THE INVENTION

The present invention provides a method and apparatus for the early prediction of whether floating-point exceptions could occur on data processing systems having floating-point units. Specifically, the method and apparatus of the present invention predict whether an overflow or underflow floating-point exception could occur as a result of a data processing system performing a particular floating-point add/subtract, multiply, multiply-add (Madd), or divide/square root operation. The invention makes its predictions based on at least one overflow threshold value, at least two underflow thresholds values (e.g., a first underflow threshold value and a second underflow threshold value), and a preliminary result exponent value that is derived from the values of the exponents of the floating-point numbers that are about to be acted upon by a data processing system.

An overflow or underflow exception prediction signal is generated by the present invention whenever the present invention predicts that an overflow or underflow exception could occur, respectively. The prediction signals generated by the present invention may be used by data processing system control units to temporarily halt any parallel processing operations that may be affected by an overflow or underflow floating-point exception prior to the exception actually occurring. To accomplish this feature, the present invention compares the value of a preliminary result exponent to the values of an overflow or underflow threshold. If the value of the preliminary result exponent is greater than or equal to the value of the overflow threshold, an overflow exception prediction signal is generated by an exception prediction unit. Similarly, if the value of the preliminary result exponent is less than the value of the underflow threshold to which it is compared, an underflow exception prediction signal is generated by an exception prediction unit.

An advantage of the present invention is that it is more accurate than prior methods in its predictions of floating-point exceptions, thereby improving the operational characteristics of data processing systems that employ the present invention. Additional features of this invention will become apparent from the following detailed description of the best mode for carrying out the invention and from the claims.

BRIEF DESCRIPTION OF THE FIGURES

The accompanying drawings, which are incorporated herein and form part of the specification, illustrate a preferred embodiment of the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

The present invention is implemented in a data processing system (e.g., a digital computer system) having a floating-point unit (FPU). An FPU is a specialized integrated circuit for performing floating-point computations, such as addition, subtraction, multiplication, division, and square root. Floating-point units are also called math coprocessors, numeric coprocessors, coprocessors, or simply processors. Associated with an FPU is a floating-point instruction set.

Most instructions in the instruction set specify a floating-point computation and one, two or three operands depending on the operation. An example floating-point instruction is: ADD(A,B). A and B are the operands, and the computation specified by the instruction is, of course, to add A to B. Another floating-point instruction is MADD(A,B,C), where A, B and C are the operands. The MADD instruction is called a multiply-add instruction. As its name implies, this instruction instructs the FPU to multiply A and B to produce a product and then to add the product to C. Other instructions are included in the instruction set, but it is not necessary for understanding the present invention to describe each instruction in detail.

Figure 1:
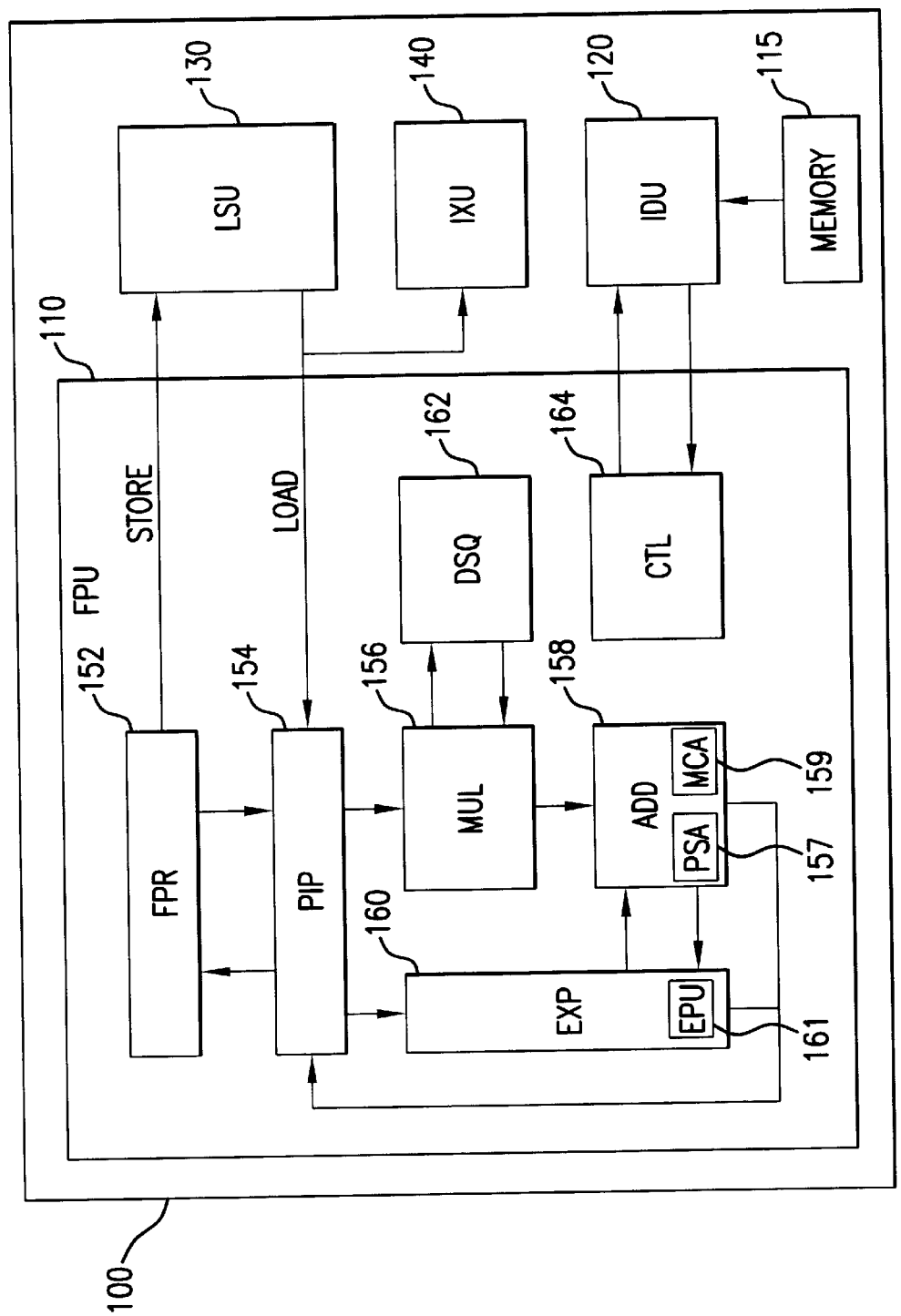
FIG. 1 is a block diagram of a portion of a computer system according to one embodiment of the invention.

FIG. 1 is a block diagram of a portion of a computer system 100 according to one embodiment of the invention. Computer system 100 includes a floating-point unit (FPU) 110 that implements a floating-point instruction set. FPU 110 supports the IEEE-754 standard for binary floating-point arithmetic and enhances, among other things, geometric computations in 3D-graphics applications executed on computer system 100.

Computer system 100 further includes an instruction dispatch unit (IDU) 120, a load store unit (LSU) 130, and an integer execution unit (IXU) 140. IDU 120 is interfaced with instruction memory 115, which stores, among other things, floating-point instructions. IDU 120 dispatches the floating-point instructions to FPU 110 and keeps track of the state of each dispatched floating-point instruction, the register dependency, and the possibility of bypassing a resultant operand to the next FPU instruction. FPU 110 performs floating-point computations, as directed by the floating-point instructions dispatched by IDU 120. LSU 130 interfaces with other elements that are internal or external to processor 100, and provides data to, and receives data from FPU 110. For example, operands are loaded from LSU 130 to FPU 110 and results are stored from FPU 110 to LSU 130. IXU 140 performs integer computations, and is able to transfer data to, and receive data from, FPU 110.

FPU 110 includes a floating-point register file (FPR) 152 that interfaces with LSU 130. FPR 152 includes a number of read ports and a number of write ports. More specifically, in one embodiment, FPR 152 is a 32-entry 64-bit register file with four read ports and two write ports.

A floating-point pipe file (PIP) 154 couples to FPR 152 and further interfaces with LSU 130 and IXU 140. For each instruction, PIP 154 selects and receives operands from, among other sources, FPR 152. In this embodiment, PIP 154 unpacks the received operands from an IEEE compliant format (also referred to herein as "memory format") into an internal data format recognized by the processing units within FPU 110. The internal data format of PIP 154 is similar to the IEEE-754 standard format, except that, among other things, the internal data format utilizes a 12-bit exponent field. The 12-bit exponent field provides an advantage in that it makes it likely that all intermediate results can be represented in normalized form. PIP 154 also packs the results from FPU 110 into the memory format (i.e., IEEE compliant format) required by the external circuitry and provides the packed results to FPR 152.

FPU 110 uses an internal data format that is comprised of a pseudo-normalized mantissa and a biased exponent similar to IEEE's standard format. The pseudo-normalized mantissa format used by FPU 110 is different than a normalized mantissa format, which only has one bit to the left of the decimal point. For example, a floating-point number represented in a normalized mantissa format would have a format 1.xx—xx, whereas a number in the internal data format would have pseudo-normalized mantissa in the format 01.xx—xx or 1x.xx—xx. The pseudo-normalized format is described in the above-referenced U.S. patent application Ser. No. 09/364,512. In the embodiment of FIG. 1, the input of MUL 156 and output of ADD 158 are typically in the format of 01.xx—xx. In one embodiment, the exponent associated with the internal format ($E_{int}$) is a real exponent value ($E_{real}$) biased with a negative 1 (i.e., $E_{int}=E_{real}-1$). For ease of explanation, the discussion that follows (unless otherwise noted) assumes that floating-point numbers are represented with an unbiased (i.e., real) exponent value.

A floating-point multiplier (MUL) 156 couples to PIP 154 and executes floating-point multiply instructions as well as the multiply portion of compound instructions such as a multiply-add (MADD) instruction. MUL 156 receives the mantissas of two operands from PIP 154. MUL 156 is described in further detail in the above-referenced U.S. patent application Ser. No. 09/364,514.

A floating-point adder (ADD) 158 couples to PIP 154 and MUL 156. ADD 158 executes floating-point add and subtract instructions as well as the add portion of compound instructions such as MADD. ADD 158 receives two operands and performs floating-point magnitude addition/subtraction using, for example, a prescale adder (PSA) 157 operated in parallel with a massive cancellation adder (MCA) 159. The final output is selected from one of the adders based on, among other things, the exponent difference of the two input operands. Selection criteria for PSA and MCA are further described in the above-referenced U.S. patent application Ser. No. 09/364,512. The final output is then provided to PIP 154 for storage.

Floating-point addition/subtraction is slightly different from integer addition/subtraction in that the floating-point numbers can have different exponents, thus requiring potentially large shifts to align the mantissas in significance. Furthermore, after a magnitude subtraction computation, the resulting mantissa could have a large number of leading zeros, thus requiring another shift to renormalize the number. Magnitude addition is defined as addition of numbers with like signs or subtraction of numbers with different signs. Magnitude subtraction is defined as addition of numbers with different signs or subtraction of numbers with like signs.

A floating-point control unit (CTL) 164 is the control unit for FPU 110. Floating-point instructions are sent to CTL 164 from IDU 120. IDU 120 receives instructions stored in instruction memory 115. Instruction memory 115 is a conventional memory, such as random access memory, for storing program instructions. CTL 164 interacts with each above described floating-point section and directs the data path through the proper sequence of operations to generate the proper output.

A floating-point exponent unit (EXP) 160 functions to determine the exponent of a result of a given floating-point arithmetic operation. In general, EXP 160 determines what the preliminary result exponent will be based on the exponents of the input operands, but it must subsequently interact with the mantissa calculation units (e.g., MUL 156 and ADD 158) to determine how to adjust the result exponent value based on normalization shifts. EXP 160 includes an exception prediction unit (EPU) 161 that functions to generate an exception prediction signal when there is a possibility that a computation performed by MUL 156 and/or ADD 158 could cause an overflow or underflow exception. The exception prediction signal is provided to CTL 164. CTL 164 reports exceptions to IDU 120, which then causes other processing units (not shown) within computer system 100 to temporarily halt operation. If it turns out that the computation does not actually cause an overflow or underflow exception, IDU 120 is so notified and the other processing units resume operation.

A floating-point divide/square-root unit (DSQ) 162 couples to MUL 156 and operates on the mantissas for divide and square root instructions. DSQ 162 is designed to implement a particular algorithm (e.g., a radix-2 or radix-4 SRT).

Figure 2:
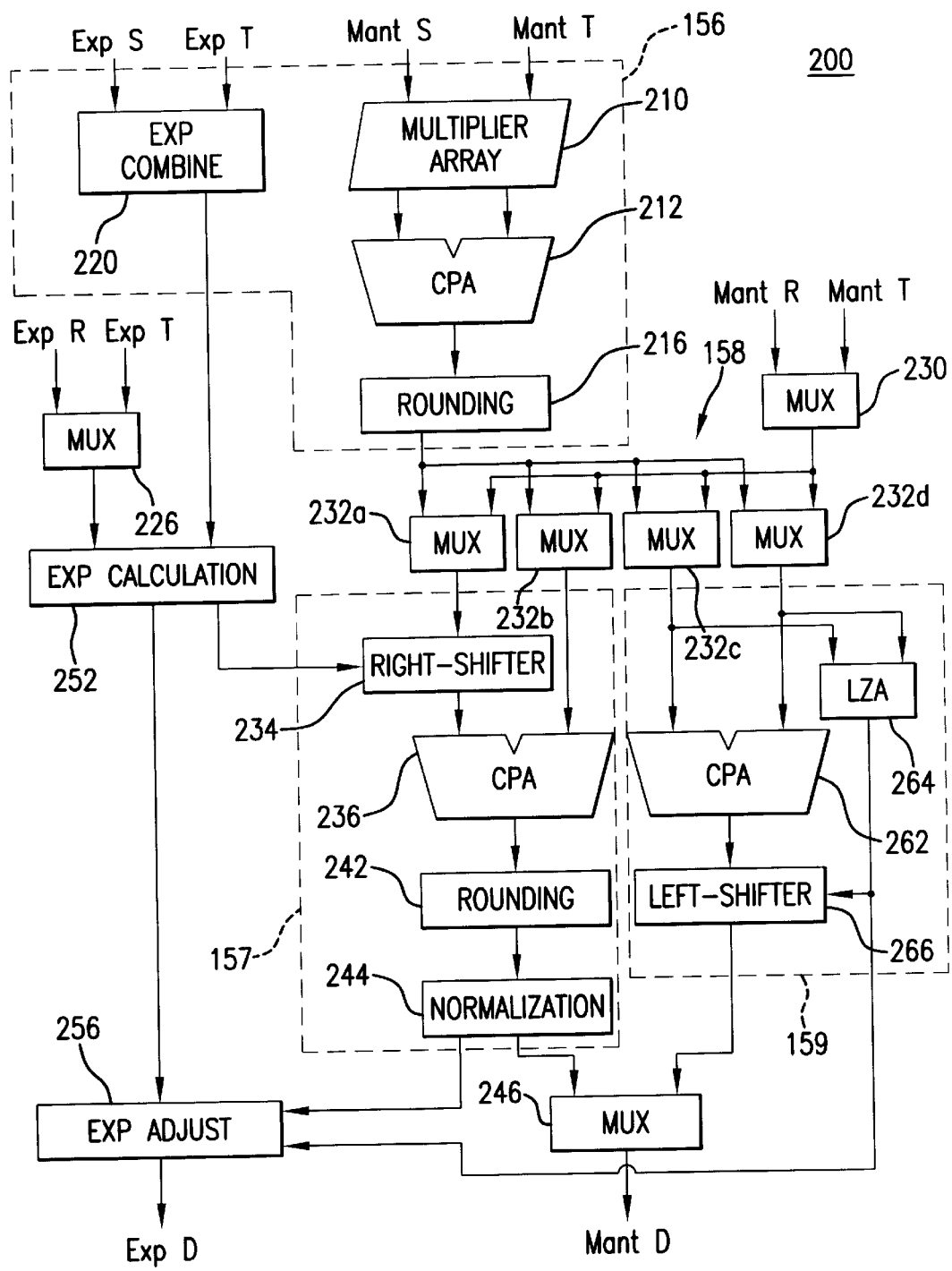
FIG. 2 is a block diagram of a portion of a floating-point unit shown in FIG. 1 that is capable of performing a variety of operations, including add, subtract, multiply, and multiply-add (Madd) operations, and at least a portion of divide/square root operations.

FIG. 2 shows a block diagram of an example embodiment 200 of an FPU 110 capable of performing a number of operations, including add, subtract, multiply, and multiply-add (Madd) operations, and at least a portion of divide/square root operations (e.g., exponent computation). Note, however, embodiment 200 of FIG. 2 depicts only a portion of FPU 110 shown in FIG. 1. FPU 200 primarily shows a MUL unit 156 coupled to an ADD unit 158. Support circuitry, such as that shown in FIG. 1, is not shown in FIG. 2 for simplicity. MUL unit 156 comprises a multiplier array 210, a carry-propagation adder (CPA) 212, a rounding unit 216, and an exponent combine unit 220. ADD unit 158 includes the remaining units shown in FIG. 2. FPU 200 includes several features that increase accuracy, simplify the hardware design, and improve operational performance, as described below.

At any given moment, FPU 200 can be configured to perform one of at least three different operations including addition/subtraction, multiplication, and Madd. These operations are expressed by the following:

| | |
|---|---:|
| $Fd=Fs\pm Ft$, | Add/Subtract |
| $Fd=Fs\cdot Ft$, | Multiply |
| $Fd=\pm((Fs\cdot Ft)\pm Fr)$, | Madd | where Fd is the resultant output and Fr, Fs, and Ft are three input operands.

As shown in FIG. 2, the mantissa, Mant S and Mant T, for two operands S and T, respectively, are provided to multiplier array 210. Multiplier array 210 can implement, for example, a Booth or modified Booth algorithm, and can include partial product generation logic (not shown) and a number of carry-save adders (not shown). The partial product generation logic produces partial products based on the mantissas. The carry-save adders add a number of partial products together and send the outputs to other carry-save adders in a tree-like fashion until only two numbers are left, the final sum and carry. In a specific implementation, the carry-save adders take in four terms and combine them into two terms, but other configurations are possible.

Multiplier array 210 thus multiplies the two operands and provides the product in sum-and-carry format to CPA 212. CPA 212 combines the sum and carry and provides the resultant mantissa to rounding unit 216 that processes the mantissa based on a specific rounding mode of the FPU. The processed mantissa comprises the output mantissa from the MUL.

The exponents, Exp S and Exp T, of the two operands S and T, respectively, are provided to exponent combination unit 220 that combines the exponents for a multiply operation. The combined exponent from unit 220 comprises the output exponent from MUL unit 156.

In a preferred embodiment of the invention that provides improved performance (i.e., faster operating speed), ADD unit 158 includes a PSA 157 and an MCA 159 operated in parallel. Depending on the characteristics of the operand, the output from either PSA 157 or MCA 159 is selected.

To perform a floating-point addition, the mantissas of the two operands are typically aligned by shifting one of the mantissas and adjusting its exponent until the exponents of the two operands are equal. The mantissas are then combined (e.g., added or subtracted), and the resultant mantissa is normalized. The number of shifts prior to the combination can be large (e.g., when adding a large number with a small number), and the number of shifts after the combination can also be large (e.g., when subtracting two operands having similar magnitudes). PSA 157 and MCA 159 are designed to efficiently process most input conditions, including these two extreme conditions.

For PSA 157, the mantissa from rounding unit 216 is provided to MUXes 232a and 232b. The mantissas for operands R (Mant R) and T (Mant T) are provided to a MUX 230 that selects one of the mantissas, based on the operation to be performed, and provides the selected mantissa to MUXes 232a and 232b. MUX 232a selects the mantissa of the smaller operand and provides the selected mantissa to a right-shift unit 234. MUX 232b selects the mantissa of the larger operand and provides the selected mantissa to a CPA 236.

The exponents of operands R (Exp R) and T (Exp T) are provided to a MUX 226 that selects one of the exponents based on the operation to be performed. The selected exponent from MUX 226 and the combined exponent from unit 220 are provided to an exponent calculation unit 252 that determines the difference between the two exponents and a preliminary result exponent. Determination of the preliminary result exponent is described below. The preliminary result exponent (e.g., the larger exponent when performing an Add operation) is provided to an exponent adjustment unit 256 and the exponent difference is provided to right-shift unit 234 that shifts the mantissa of the smaller operand to the right by the indicated exponent difference. The shifted mantissa is provided to CPA 236 that combines the two mantissas and provides a combined mantissa to a rounding unit 242. Rounding unit 242 rounds the combined mantissa and provides the rounded mantissa to a normalization unit 244.

The mantissa from CPA 236 can be in a non-normalized format. Normalization unit 244 normalizes the result to the 0.1.xx—xx format by performing a 1- or 2-bit right-shift or 1-bit left-shift, if necessary. The exponent is adjusted by exponent adjustment unit 256, as necessary, based on the normalization performed by normalization unit 244.

The MCA portion of FPU 200 includes a CPA 262, a leading zero anticipator (LZA) 264, and a left-shift unit 266. For MCA 159, the mantissa from rounding unit 216 and MUX 230 are provided to MUXes 232c and 232d. MUXes 232 facilitate a small shift of one of the mantissas, based on the exponent difference, to align the mantissas. MUXes 232 are also used to select one of the mantissas for inversion in subtraction operations (the inverter is not shown in FIG. 2 for simplicity). The outputs from MUXes 232c and 232d are provided to CPA 262 and LZA 264. CPA 262 combines the two mantissas and provides a combined mantissa to left-shift unit 266. LZA 264 anticipates the number of leading zeros in the resultant mantissa, based on the input operands. The output from LZA is encoded into a control signal that defines the number of shifts for left-shift unit 266. The control signal is also provided to exponent adjust 256 to adjust the exponent.

The outputs from normalization unit 244 and left-shift unit 266 are provided to a MUX 246 that selects the output from the PSA or MCA as the output mantissa (Mant D) from FPU 200. MUX 246 selects the output from either PSA 157 or MCA 159 based on, among other things, the exponent difference between the two input operands (e.g., Exp S and Exp T). Selection criteria for PSA and MCA are further described in the above-referenced U.S. patent application Ser. No. 09/364,512. The adjusted exponent from unit 256 comprises the output exponent (Exp D) from FPU 200. The operation of FPU 200 is further described in the above-referenced U.S. patent application Ser. No. 09/364,514.

FIG. 2 shows a Madd architecture in which two rounding operations can be performed, one after the multiply operation and the other after the add operation. This Madd architecture can generate Madd results that fulfill the IEEE-754 rounding requirements as if the multiply and add were executed separately.

Figure 3:
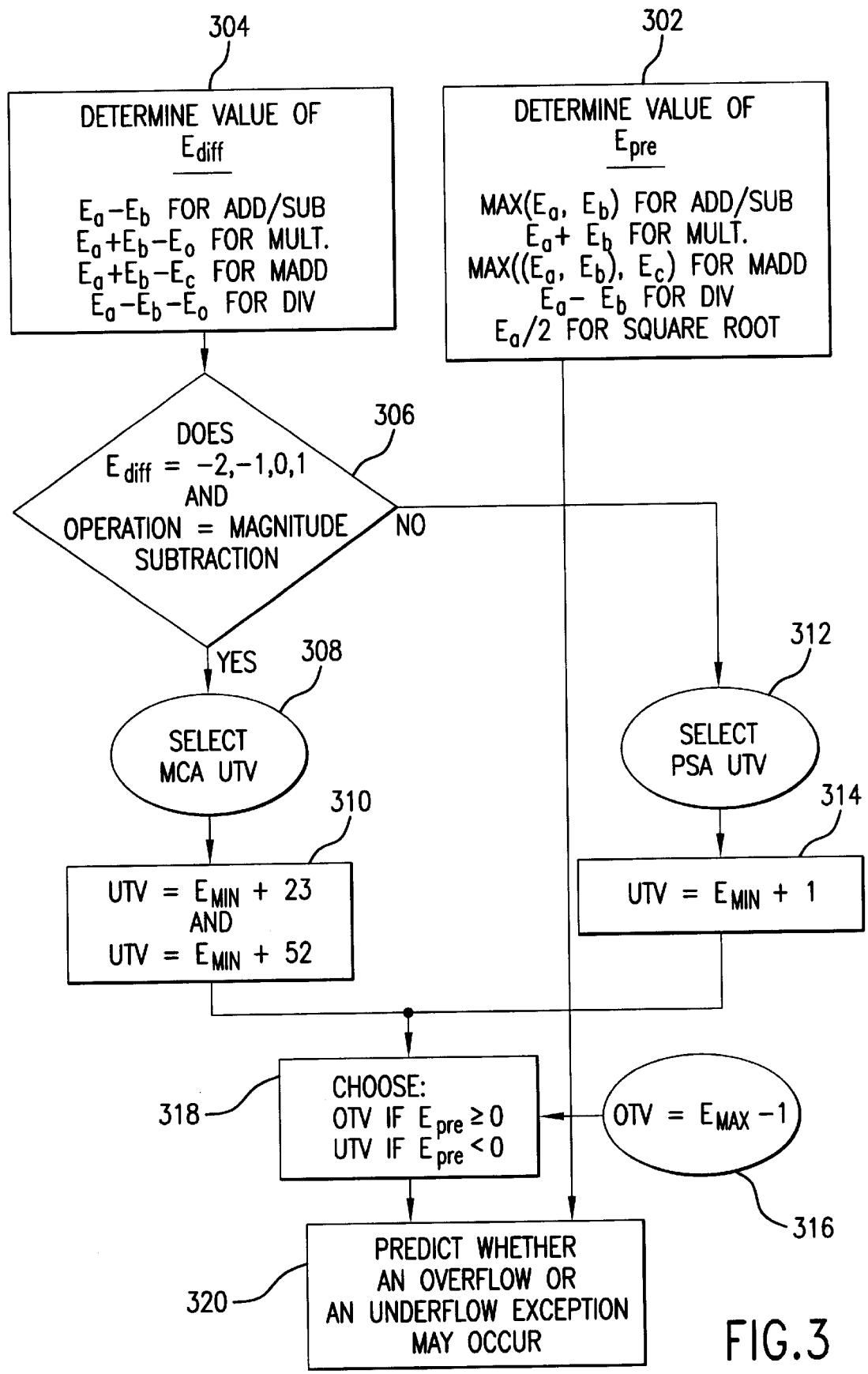
FIG. 3 illustrates, according to one embodiment of the present invention, a method for predicting floating-point exceptions.

FIG. 3 illustrates one embodiment of a method implemented by EPU 161 for determining whether a given floating-point computation may possibly cause an overflow or underflow floating-point exception. The method begins in step 302.

In step 302, a preliminary result exponent ($E_{pre}$) is determined based on the type of operation to be performed and the exponents of up to three input data ($E_a$, $E_b$, and $E_c$). For example, for an add operation, $E_{pre}$=MAX($E_a$, $E_b$), where $E_a$ is the exponent of a first floating-point number and $E_b$ is the exponent of a second floating-point number. The function MAX($E_a$, $E_b$) produces the value $E_a$ if $E_a$ is greater than or equal to $E_b$, otherwise it produces the value $E_b$. The values determined for $E_{pre}$ in step 302 are as follows:

| | |
|---|---|
| $E_{pre}$=MAX($E_a$, $E_b$), | for an Add/Subtract operation, |
| $E_{pre}$=$E_a$+$E_b$, | for a Multiply operation, |
| $E_{pre}$=MAX(($E_a$+$E_b$), $E_c$), | for a Madd operation, |
| $E_{pre}$=$E_a$-$E_b$, | for a Divide operation, and |
| $E_{pre}$=$E_a$/2 | for a Square Root operation. |

The values determined for $E_{pre}$ are slightly different for the multiply and Madd operations when using FPU 110 internal data format. As would be apparent to one having ordinary skill in the art, when using FPU 110 internal data format, the values for $E_{pre}$ in step 302 are adjusted to account for an internal bias of −1.

In step 304, the exponent difference ($E_{diff}$) between inputs is calculated to determine how to align the inputs prior to performing an add/subtract, multiply, Madd, divide or square root operation. The values determined for $E_{diff}$ in step 304 are as follows:

| | |
|---|---|
| $E_{diff}$=$E_a$-$E_b$ | for an Add/Subtract operation |
| $E_{diff}$=$E_a$+$E_b$-$E_0$, | for a Multiply operation, |
| $E_{diff}$=$E_a$+$E_b$-$E_c$, | for a Madd operation, |
| $E_{diff}$=$E_a$-$E_b$-$E_0$, | for a Divide operation, and |
| $E_{diff}$=$E_a$/2-$E_0$, | for a Square Root operation, | where $E_0$ represents the exponent of zero, since for Multiply, Divide, and Square Root operations one of the input operands to the adder is the mantissa result of the Multiply, Divide, or Square Root operation and the other input operand is zero. Once a value for $E_{diff}$ is determined in step 304, control passes to step 306.

In step 306, it is determined whether the value of $E_{diff}$ falls within a range of values and whether the computation being performed is a magnitude subtraction. If the mantissa values used in the FPU were represented in normalized mantissa format, this range of values for $E_{diff}$ would be set equal to $-1$, 0, and 1. When mantissa values used in the FPU are represented in the pseudo-normalized format, this range of values for $E_{diff}$ is set equal to $-2$, $-1$, 0, and 1. The determination as to whether $E_{diff}$ falls within the appropriate range may be carried out any number of ways, including determining whether $E_{diff}$ is greater than or equal to the smallest value in the range (i.e., a minimum threshold value) and less than or equal to the largest value in the range (i.e., a maximum threshold value). If both conditions of step 306 are satisfied (i.e., $E_{diff}$ falls within the applicable range of values so that it is greater than or equal to a minimum threshold value and less than or equal to a maximum threshold value, and the operation is a magnitude subtraction), control passes to step 308, otherwise control passes to step 312.

In step 308, a determination is made to use an underflow threshold value (UTV) associated with MCA 159. UTV is a value that may be compared to the preliminary result exponent to predict whether an underflow exception could occur. It should be noted, however, that just because the UTV associated with MCA 159 will be used to predict whether an underflow exception may occur, this does not necessarily mean that MCA 159 will be used to actually perform the calculation. The criteria that are used for determining which UTV will be used to predict whether an underflow exception is possible may be different from the criteria that are used for determining whether MCA 159 or PSA 157 will be used to perform the calculation. Thus, it may be that the UTV associated with MCA 159 is used to predict whether an underflow exception is possible even though the actual calculation will be performed using PSA 157. The criteria for determining whether MCA 159 or PSA 157 is used to perform a calculation is described in the aforementioned U.S. patent application Ser. No. 09/364,512.

In step 310, UTV is set equal to $E_{min}+23$ if a single precision floating-point number is being used or to $E_{min}+52$ if a double precision floating-point number is being used, where $E_{min}$ is a minimum allowable exponent value of a normalized number. According to the IEEE floating-point standard, $E_{min}$ equals $-126$ for single precision numbers and $-1022$ for double precision numbers. The reason for setting UTV to $E_{min}+23$ or $E_{min}+52$ in this instance is because the largest possible number of left shifts during a magnitude subtraction is 23 bits for a single precision number and 52 bits for a double precision number. When a magnitude subtraction is being performed on two operands whose exponents are nearly equal, the resulting difference could be orders of magnitude smaller than either of the two input operands. If this occurs, a large normalization left shift will be required after the magnitude subtraction is performed. Because the fractional portion of a mantissa is represented by 23 bits in a single precision floating-point number and 52 bits in a double precision floating-point number, the largest normalization left shift possible for a single precision or double precision floating-point number is 23 or 52 bits, respectively. It is these mantissa widths that form the basis for the value assigned to UTV. When describing the block diagram of FIG. 4, herein below, this value of UTV is referred to as underflow threshold value two (UTV2).

In step 312, a determination is made to use the UTV associated with PSA 157. When it is determined that the UTV associated with PSA 157 will be used, the calculation will be performed using PSA 157.

In step 314, UTV is set equal to $E_{min}+1$, where $E_{min}$ is a minimum allowable exponent value of a normalized number. The reason for setting UTV to $E_{min}+1$ in this instance is that if $E_{pre}$ is less than $E_{min}+1$, there is a possibility that during normalization the resulting exponent may fall below $E_{min}$ and trigger an underflow exception. When describing the block diagram of FIG. 4, herein below, this value of UTV is referred to as underflow threshold value one (UTV1).

In step 316, an overflow threshold value (OTV) is set equal to $E_{max}-1$, where $E_{max}$ is a maximum allowable exponent value of a normalized number. OTV is a value that may be compared to the preliminary result exponent to predict whether an overflow exception could occur. According to the IEEE floating-point standard, $E_{max}$ is $+127$ for single precision numbers and $+1023$ for double precision numbers. The reason that OTV is set equal to $E_{max}-1$ is that if $E_{pre}$ is greater than or equal to $E_{max}-1$, there is a possibility that during normalization the resulting exponent may rise above $E_{max}$ and trigger an overflow exception.

In step 318, it is determined whether to use either OTV or UTV as the input to step 320. When the value determined for $E_{pre}$ in step 302 is positive (i.e., $E_{pre} \geq 0$), OTV will be chosen in step 318 and provided as the input to set 320. When the value determined for $E_{pre}$ in step 302 is negative (i.e., $E_{pre}<0$), UTV will be chosen in step 318 and provided as the input to step 320. Thus, it is the sign of $E_{pre}$ that ultimately determines whether step 320 compares $E_{pre}$ to OTV or UTV because in this embodiment OTV is a large positive number and UTV is a large negative number.

Finally, in step 320, the output of step 318 (i.e., OTV or UTV) is compared to the output of step 302 ($E_{pre}$) to predict whether a given floating-point calculation may possibly cause an overflow or underflow exception. If $E_{pre}$ is greater than or equal to OTV, an overflow exception prediction signal is generated. If $E_{pre}$ is less than UTV, an underflow exception prediction signal is generated. If neither of these conditions is meet, no exception prediction signal based on overflow or underflow criteria is generated.

Figure 4:
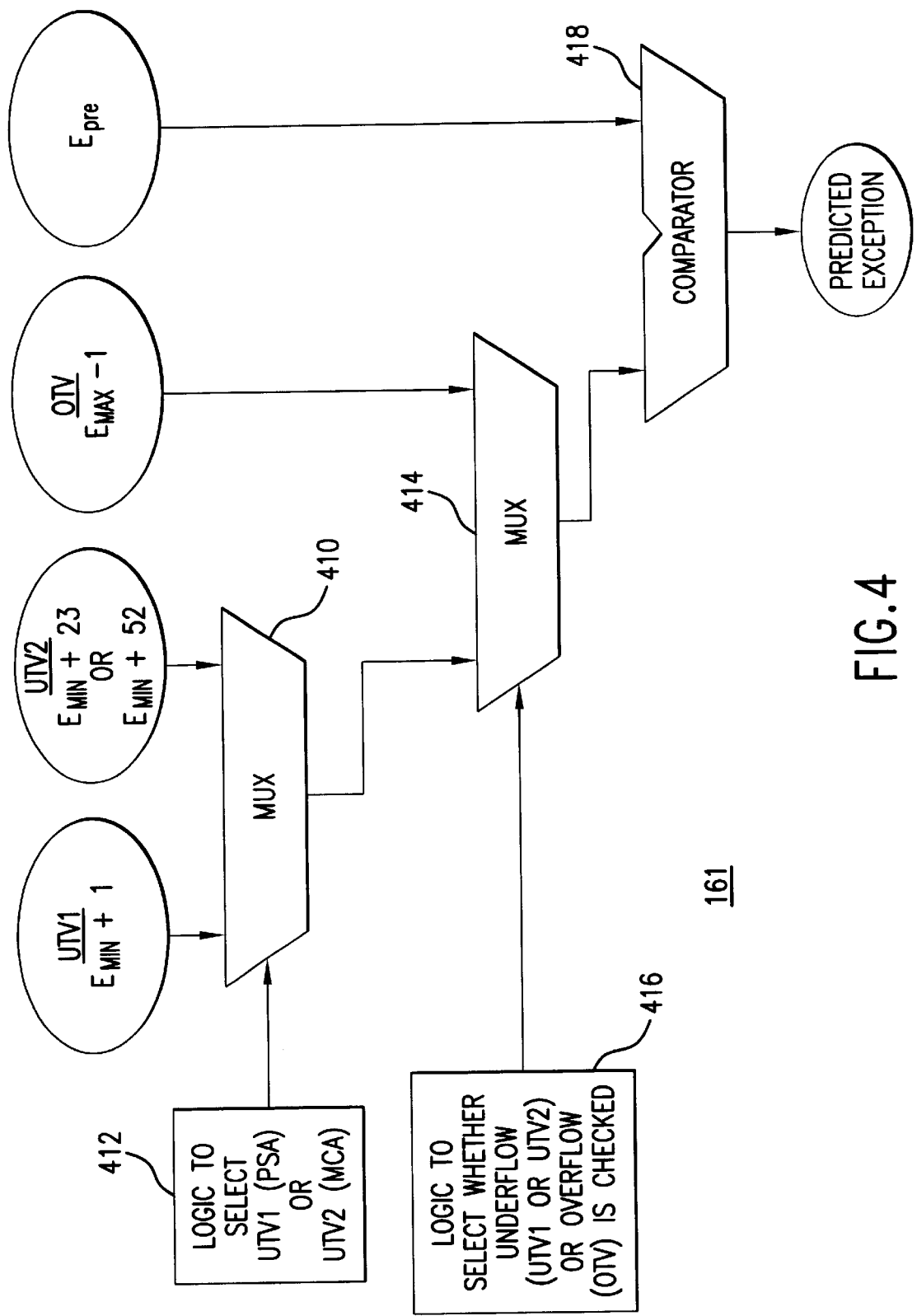
FIG. 4 is a block diagram of one embodiment of an exception prediction unit.

FIG. 4 illustrates one possible implementation of EPU 161. One skilled in the art will recognize that EPU 161 can be implemented in a variety of ways, and that the invention is not limited to a specific implementation of EPU 161. For example, EPU 161 can be partially or entirely implemented using a programmable logic device (PLD), programmable logic array (PLA), Field-Programmable Gate Array (FPGA), application specific integrated circuit (ASIC), or other equivalent hardware or software.

Referring now to FIG. 4, MUX 410 receives as inputs UTV1 and UTV2, where UTV1 is equal to $E_{min}+1$ and UTV2 is equal to either $E_{min}+23$ or $E_{min}+52$, and it provides an output to MUX 414. As described above with regard to FIG. 3, control logic 412 will select UTV2 as the output of MUX 410 only when a magnitude subtraction is being performed and only when the exponents of the two operands are nearly equal. Otherwise, control logic 412 will select UTV1 as the output of MUX 410.

MUX 414 receives as its inputs the output of MUX 410 (i.e., UTV1 or UTV2) and OTV, where OTV is equal to $E_{max}-1$, and it provides its output to comparator 418. Control logic 416 is used to determine whether MUX 414 outputs OTV or the output of MUX 410. As described above, control logic 416 selects OTV as the output of MUX 414 whenever the value of $E_{pre}$ is positive (i.e., $E_{pre} \geq 0$). Whenever the value of $E_{pre}$ is negative (i.e., $E_{pre}<0$), control logic 416 selects the output of MUX 410 (i.e., UTV1 or UTV2) to be the output of MUX 414.

Finally, comparator 418 receives as its inputs $E_{pre}$ and the output of MUX 414, and it compares $E_{pre}$ to the output of MUX 414 to predict the possibility that either an underflow or overflow exception will occur as a result of the operation to be performed by MUL 156 and/or ADD 158. If $E_{pre}$ is greater than or equal to OTV, an overflow exception prediction signal is generated. If $E_{pre}$ is less than UTV, an underflow exception prediction signal is generated. If neither of these conditions is met, no exception prediction signal based on overflow or underflow criteria is generated.

In an alternative embodiment of the present invention, a second OTV may be used in the method of FIG. 3 to more accurately predict overflow exceptions. As background, the maximum pre-normalized value that may be produced from a Madd operation performed by the architecture of FIG. 2 has a format of 1xx.xx—xx. Hence, the largest normalization shift such a value will require is a 2-bit shift to the right. Therefore, an overflow prediction signal for Madd operations should be triggered when the preliminary result exponent is greater than $E_{max}-2$. This is reflected in the overflow prediction test described above, where an overflow prediction signal is generated if $E_{pre}$ is greater than or equal to $E_{max}-1$ (i.e., OTV is set equal to $E_{max}-1$).

However, the maximum pre-normalized value that may be produced from a non-Madd operation performed by the architecture of FIG. 2 has a format of 1x.xx—xx. Hence, the largest normalization shift such a value will require is a 1-bit shift to the right. Therefore, an overflow prediction signal for non-Madd operations can safely be triggered when the preliminary result exponent is greater than $E_{max}-1$. This can be embodied in a second OTV which is set equal to $E_{max}$, and an overflow prediction test which triggers an overflow prediction signal if $E_{pre}$ is greater than or equal to $E_{max}$. This operation-specific OTV could more accurately predict overflow exceptions in non-Madd operations.

Referring to FIG. 3, this alternative embodiment could be incorporated through additional functionality to block 316. If the operation were Madd, block 316 would set OTV equal to $E_{max}-1$. However, if the operation were non-Madd, block 316 would set OTV equal to Emax. If an overflow test were chosen (based on the sign of the preliminary exponent), block 318 would select the appropriate constant from block 316 and send it to block 320 for comparison. The remaining operation in FIG. 3 would remain unchanged.

Additional OTVs (as well as UTVs) may be integrated into the embodiment described above to provide more tailored threshold values for given situations, and therefore more accurate predictions. These additional threshold values could be selectively applied through conventional control logic.

In addition to implementations of the invention using hardware, the invention can also be embodied in an article of manufacture comprised of a computer usable medium configured to store a computer-readable program code. The program code causes the enablement of the functions or fabrication, or both, of the hardware disclosed in this specification. For example, this might be accomplished through the use of general programming languages (e.g., C, C++, and so on), hardware description language (HDL), register transfer language (RTL), Veri log HDL, VHDL, AHDL (Altera hardware description language), or other programming and/or circuit (i.e., schematic) capture tools available in the art. As a specific example, the Verilog simulator "VCS v.4.1.1" by Synopsys, Inc. was used to simulate the invention. A book entitled "A Verilog HDL Primer" by J. Bhasker, Star Galaxy Pr., 1997 provides greater detail on Verilog HDL, and is incorporated herein by reference in its entirety for all purposes.

It is understood that the functions accomplished by the invention as described above could be represented in a core which could be utilized in programming code and transformed to hardware as part of the production of integrated circuits. Also, other implementations of the invention, using a combination of hardware and software are also possible. Therefore, the embodiments expressed above are within the scope of the invention and should also be considered protected by this patent.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. In a data processing system of the type having a processing unit being operable to perform computations using floating-point numbers, a method for predicting whether a floating-point computation involving a first floating-point number and a second floating-point number could result in a floating-point exception and for generating an exception prediction signal if a floating-point exception is predicted, the method comprising the steps of:

determining a preliminary result exponent, where the preliminary result exponent is a function of an exponent of the first floating-point number and an exponent of the second floating-point number;

selecting a first threshold value and a second threshold value according to the mantissa format of the first floating-point number and the second floating-point number;

if the floating-point computation is a magnitude subtraction and the difference between said exponent of the first floating-point number and said exponent of the second floating-point number is greater than said first threshold value or less than said second threshold value, then generating an underflow exception prediction signal if the value of said preliminary result exponent is less than a first underflow threshold value; and if the floating-point computation is a magnitude subtraction and the difference between said exponent of the first floating-point number and said exponent of the second floating-point number is less than or equal to said first threshold value and greater than or equal to said second threshold value, then generating an underflow exception prediction signal if the value of said preliminary result exponent is less than a second underflow threshold value, wherein said first underflow threshold value is less than said second underflow threshold value.

2. The method of claim 1, wherein said preliminary result exponent is the greater of said exponent of the first floating-point number and said exponent of the second floating-point number.

3. The method of claim 1, wherein said second underflow threshold value (UTV2) is determined according to the following equation: $UTV2=E_{min}+C$, wherein $E_{min}$ is a minimum allowable exponent value and C is a constant, wherein C is equal to 23 for single precision floating-point computations and C is equal to 52 for double precision floating-point computations.

4. The method of claim 1, wherein said first underflow threshold value (UTV1) is determined according to the following equation: $UTV1=E_{min}+1$, wherein $E_{min}$ is a minimum allowable exponent value.

5. The method of claim 1, further comprising the step of generating an overflow exception prediction signal if the value of said preliminary result exponent is greater than or equal to an overflow threshold value.

6. The method of claim 5, wherein said overflow threshold value (OTV) is determined according to the following equation: $OTV=E_{max}-1$, wherein $E_{max}$ is a maximum allowable exponent value.

7. The method of claim 5, further comprising the step of temporarily halting operation of a second processing unit within the data processing system if either said overflow or underflow exception prediction signal is generated.

8. The method of claim 7, further comprising the step of resuming operation of said second processing unit if the computation does not result in an actual floating-point exception.

9. The method of claim 7, further comprising the step of generating an interrupt signal when the computation results in an actual floating-point exception.

10. A data processing system having a processing unit operable to perform a computation using a first floating-point number and a second floating-point number, the processing unit comprising:

means for determining a preliminary result exponent, where the preliminary result exponent is a function of an exponent of the first floating-point number and an exponent of the second floating-point number;

means for selecting a first threshold value and a second threshold value according to the mantissa format of the first floating-point number and the second floating-point number;

means for generating an underflow exception prediction signal when: (1) the value of said preliminary result exponent is less than a first underflow threshold value, and (2) (a) the magnitude of the difference between said exponent of the first floating-point number and said exponent of the second floating-point number is greater than said first threshold value or less than said second threshold value, or (b) the floating-point computation is not a magnitude subtraction; and means for generating said underflow exception prediction signal when: (1) the value of said preliminary result exponent is less than a second underflow threshold value, (2) the magnitude of the difference between said exponent of the first floating-point number and said exponent of the second floating-point number is less than or equal to said first threshold value and greater than or equal to said second threshold value, and (3) the floating-point computation is a magnitude subtraction, wherein said first underflow threshold value is less than said second underflow threshold value.

11. The data processing system of claim 10, wherein said preliminary result exponent is the greater of said exponent of the first floating-point number and said exponent of the second floating-point number.

12. The data processing system of claim 10, wherein said second underflow threshold value (UTV2) is determined according to the following equation: $UTV2=E_{min}+C$, wherein $E_{min}$ is a minimum allowable exponent value and C is a constant, wherein C is equal to 23 for single precision floating-point computations and C is equal to 52 for double precision floating-point computations.

13. The data processing system of claim 10, wherein said first underflow threshold value (UTV1) is determined according to the following equation: $UTV1=E_{min}+1$, wherein $E_{min}$ is a minimum allowable exponent value.

14. The data processing system of claim 10, further comprising means for generating an overflow exception prediction signal if the value of said preliminary result exponent is greater than or equal to an overflow threshold value.

15. The data processing system of claim 14, wherein said overflow threshold value (OTV) is determined according to the following equation: $OTV=E_{max}-1$, wherein $E_{max}$ is a maximum allowable exponent value.

16. The data processing system of claim 14, further comprising means for temporarily halting operation of a second processing unit within the data processing system if either said overflow or underflow exception prediction signal is generated.

17. The data processing system of claim 16, further comprising means for resuming operation of said second processing unit if the computation does not result in an actual floating-point exception.

18. The data processing system of claim 16, further comprising means for generating an interrupt signal when the computation results in an actual floating-point exception.

19. A floating-point unit for performing a floating-point computation using a first floating-point number and a second floating-point number, comprising:

a mantissa adder to produce a mantissa sum by adding a mantissa of the first floating-point number to a mantissa of the second floating-point number; and an exception prediction unit that receives an exponent of the first floating-point number and an exponent of the second floating-point number, and that produces a preliminary result exponent, where said preliminary result exponent is a function of said exponent of the first floating-point number and said exponent of the second floating-point number;

generates an underflow exception prediction signal when: (1) the value of said preliminary result exponent is less than a first underflow threshold value, and (2) (a) the magnitude of the difference between said exponent of the first floating-point number and said exponent of the second floating-point number is greater than a first threshold value or less than a second threshold value, said first threshold value and said second threshold value selected according to the mantissa format of the first floating-point number and the second floating-point number, or (b) the floating-point computation is not a magnitude subtraction; and generates said underflow exception prediction signal when: (1) the value of said preliminary result exponent is less than a second underflow threshold value, (2) the magnitude of the difference between said exponent of the first floating-point number and said exponent of the second floating-point number is less than or equal to said first threshold value and greater than or equal to said second threshold value, and (3) the floating-point computation is a magnitude subtraction, wherein said first underflow threshold value is less than said second underflow threshold value.

20. The floating-point unit of claim 19, wherein said preliminary result exponent is the greater of said exponent of the first floating-point number and said exponent of the second floating-point number.

21. The floating-point unit of claim 19, wherein said second underflow threshold value (UTV2) is determined according to the following equation: $UTV2=E_{min}+C$, wherein $E_{min}$ is a minimum allowable exponent value and C is a constant, wherein C is equal to 23 for single precision floating-point computations and C is equal to 52 for double precision floating-point computations.

22. The floating-point unit of claim 19, wherein said first underflow threshold value (UTV1) is determined according to the following equation: UTV1=$E_{min}$+1, wherein $E_{min}$ is a minimum allowable exponent value.

23. The floating-point unit of claim 19, wherein said exception prediction unit further generates an overflow exception prediction signal if the value of said preliminary result exponent is greater than or equal to an overflow threshold value.

24. The floating-point unit of claim 23, wherein said overflow threshold value (OTV) is determined according to the following equation: OTV=$E_{max}$−1, wherein $E_{max}$ is a maximum allowable exponent value.

25. The floating-point unit of claim 23, further comprising means for temporarily halting operation of a processing unit that performs operations in parallel with the floating-point unit if either said overflow or underflow exception prediction signal is generated.

26. The floating-point unit of claim 25, further comprising means for resuming operation of said processing unit if the computation does not result in an actual floating-point exception.

27. The floating-point unit of claim 25, further comprising means for generating an interrupt signal when the computation results in an actual floating-point exception.

28. A data processing system, comprising:
a memory for storing instructions;
an instruction dispatch unit for retrieving instructions from said memory;
a floating-point unit in communication with said instruction dispatch unit, said floating-point unit being operable to perform a floating-point computation using a first floating-point number and a second floating-point number to produce a floating-point value, an exponent unit that receives an exponent of said first floating-point number and an exponent of said second floating-point number and determines a result exponent; and an exception prediction unit that receives said exponent of said first floating-point number and said exponent of said second floating-point number, and that
produces a preliminary result exponent, where said preliminary result exponent is a function of said exponent of said first floating-point number and said exponent of said second floating-point number;
generates an underflow exception prediction signal when: (1) the value of said preliminary result exponent is less than a first underflow threshold value, and (2) (a) the magnitude of the difference between said exponent of said first floating-point number and said exponent of said second floating-point number is greater than a first threshold value or less than a second threshold value, said first threshold value and said second threshold value selected according to the mantissa format of the first floating-point number and the second floating-point number, or (b) said floating-point computation is not a magnitude subtraction; and
generates said underflow exception prediction signal when: (1) the value of said preliminary result exponent is less than a second underflow threshold value, (2) the magnitude of the difference between said exponent of said first floating-point number and said exponent of said second floating-point number is less than or equal to said first threshold value and greater than or equal to said second threshold value, and (3) said floating-point computation is a magnitude subtraction, wherein said first underflow threshold value is less than said second underflow threshold value.

29. The data processing system of claim 28, wherein said preliminary result exponent is the greater of said exponent of said first floating-point number and said exponent of said second floating-point number.

30. The data processing system of claim 28, wherein said second underflow threshold value (UTV2) is determined according to the following equation: UTV2=$E_{min}$+C, wherein $E_{min}$ is a minimum allowable exponent value and C is a constant, wherein C is equal to 23 for single precision floating-point computations and C is equal to 52 for double precision floating-point computations.

31. The data processing system of claim 28, wherein said first underflow threshold value (UTV1) is determined according to the following equation: UTV1=$E_{min}$+1, wherein $E_{min}$ is a minimum allowable exponent value.

32. The data processing system of claim 28, wherein said exception prediction unit further generates an overflow exception prediction signal if the value of said preliminary result exponent is greater than or equal to an overflow threshold value.

33. The data processing system of claim 32, wherein said overflow threshold value (OTV) is determined according to the following equation: OTV=$E_{max}$−1, wherein $E_{max}$ is a maximum allowable exponent value.

34. The data processing system of claim 32, further comprising means for temporarily halting operation of a processing unit that performs operations in parallel with said floating-point unit if either said overflow or underflow exception prediction signal is generated.

35. The data processing system of claim 34, further comprising means for resuming operation of said processing unit if said floating-point add computation does not result in an actual floating-point exception.

36. The data processing system of claim 34, further comprising means for generating an interrupt signal when said floating-point add computation results in an actual floating-point exception.

37. In a data processing system of the type having a first processing unit and a second processing unit, the first processing unit being operable to perform floating-point computations on first and second operands, each operand having an exponent and a mantissa, and the second processing unit being operable to perform other data processing tasks in parallel with floating-point computations being performed by the first processing unit, a method of performing a floating-point computation, comprising the steps of:
forming a first floating-point exception causing criteria value for a first subset of magnitude subtract computations;
forming a second floating-point exception causing criteria value for a second subset of magnitude subtract computations, wherein said second floating-point exception causing criteria value is distinct from said first floating-point exception causing criteria value;
comparing a preliminary result exponent to said first floating-point exception causing criteria value if the floating-point computation is within said first subset of magnitude subtract computations, wherein said preliminary result exponent is a function of the exponent of the first operand and the exponent of the second operand;
comparing said preliminary result exponent to said second floating-point exception causing criteria value if the magnitude subtract computation is within said second subset of magnitude subtract computations; and generating an exception prediction signal if any one of the two comparing steps indicates, pursuant to the criteria value used, the possibility that an exception could occur, wherein said first subset of magnitude subtract computations includes all magnitude subtract computations wherein the magnitude of the exponent difference between the exponent of the first operand and the exponent of the second operand is less than or equal to a first threshold value and greater than or equal to a second threshold value, said first threshold value and said second threshold value selected according to the mantissa format of the first operand and the second operand.

38. The method of claim 37, wherein said first subset of magnitude subtract computations includes all magnitude subtract computations wherein the magnitude of the exponent difference between the exponent of the first operand and the exponent of the second operand is less than or equal to a first threshold value and greater than or equal to a second threshold value.

39. The method of claim 37, wherein said second subset of magnitude subtract computations includes all magnitude subtract computations that are not within said first subset of magnitude subtract computations.

40. The method of claim 37, further comprising the steps of:

temporarily halting operation of the second processing unit in response to existence of said exception prediction signal;

performing the floating-point computation; and resuming operation of the second processing unit if the floating-point computation does not result in an actual floating-point exception.

41. The method of claim 37, further comprising the steps of:

generating an interrupt signal when the completion of the floating-point computation results in an actual floating-point exception;

resuming operation of the second processing unit in response to the interrupt to handle the floating-point exception by, in part, adjusting the floating-point operands causing the exception; and re-executing the floating-point computation with the adjusted floating-point operands.

42. In a data processing system of the type having a first processing unit and a second processing unit, the first processing unit being operable to perform floating-point computations on first and second operands, each operand having an exponent and a mantissa, and the second processing unit being operable to perform other data processing tasks in parallel with floating-point computations being performed by the first processing unit, the first processing unit comprising:

means for comparing a preliminary result exponent to a criteria value determined at least in party by the floating-point computation to be performed on the operands to generate therefrom a prediction signal indicative of the possibility of a floating-point exception occurring as a result of performing said floating-point computation, wherein said comparing means compares said preliminary result exponent to a first floating-point exception causing criteria value if said computation being performed is not a magnitude subtraction computation or is within a first subset of magnitude subtract computations, and said comparing means compares said preliminary result exponent to a second floating-point exception causing criteria value if said computation being performed is within a second subset of magnitude subtract computations, said second floating-point exception causing criteria value is distinct from said first floating-point exception causing criteria value, and said preliminary result exponent is a function of the exponent of the first operand and the exponent of the second operand, wherein said first subset of magnitude subtract computations includes all magnitude subtract computations wherein the magnitude of the exponent difference between the exponent of the first operand and the exponent of the second operand is less than or equal to a first threshold value and greater than or equal to a second threshold value, said first threshold value and said second threshold value selected according to the mantissa format of the first operand and the second operand.

43. The first processing unit of claim 42, wherein said first subset of magnitude subtract computations includes all magnitude subtract computations wherein the magnitude of the exponent difference between the exponent of the first operand and the exponent of the second operand is less than or equal to a first threshold value and greater than or equal to a second threshold value.

44. The first processing unit of claim 42, wherein said second subset of magnitude subtract computations includes all magnitude subtract computations that are not within said first subset of magnitude subtract computations.

45. The first processing unit of claim 42, further comprising:

means responsive to said prediction signal for stalling operation of the data processing system until completion of the floating-point computation;

means for generating an interrupt signal at the completion of the computation when a floating-point exception has occurred; and means for handling the floating-point exception and resuming operation of the data processing system with re-execution of the floating-point computation.

46. An article of manufacture comprising:

computer-readable program code for causing a computer to determine a preliminary result exponent, where the preliminary result exponent is a function of an exponent of a first floating-point number and an exponent of a second floating-point number;

computer-readable program code for causing said computer to generate an underflow exception prediction signal when: (1) the value of said preliminary result exponent is less than a first underflow threshold value, and (2) (a) the magnitude of the difference between said exponent of the first floating-point number and said exponent of the second floating-point number is greater than a first threshold value or less than a second threshold value, said first threshold value and said second threshold value selected according to the mantissa format of the first floating-point number and the second floating-point number, or (b) the floating-point computation is not a magnitude subtraction; and computer-readable program code for causing said computer to generate said underflow exception prediction signal when: (1) the value of said preliminary result exponent is less than a second underflow threshold value, (2) the magnitude of the difference between said exponent of the first floating-point number and said exponent of the second floating-point number is less than or equal to said first threshold value and greater than or equal to said second threshold value, and (3) the floating-point computation is a magnitude subtraction, wherein said first underflow threshold value is less than said second underflow threshold value; and a computer usable medium configured to store the computer-readable program codes.

47. The article of manufacture of claim 46, wherein said preliminary result exponent is the greater of said exponent of the first floating-point number and said exponent of the second floating-point number.

48. The article of manufacture of claim 46, wherein said second underflow threshold value (UTV2) is determined according to the following equation: $UTV2=E_{min}+C$, wherein $E_{min}$ is a minimum allowable exponent value and C is a constant, wherein C is equal to 23 for single precision floating-point computations and C is equal to 52 for double precision floating-point computations.

49. The article of manufacture of claim 46, wherein said first underflow threshold value (UTV1) is determined according to the following equation: $UTV1=E_{min}+1$, wherein $E_{min}$ is a minimum allowable exponent value.

50. The article of manufacture of claim 46, further comprising:

computer readable program code for causing said computer to generate an overflow exception prediction signal if the value of said preliminary result exponent is greater than or equal to an overflow threshold value.

51. The article of manufacture of claim 50, wherein said overflow threshold value (OTV) is determined according to the following equation: $OTV=E_{max}-1$, wherein $E_{max}$ is a maximum allowable exponent value.

52. The article of manufacture of claim 50, further comprising:

computer readable program code for causing said computer to temporarily halt operation of a second processing unit within the data processing system if either said overflow or underflow exception prediction signal is generated.

53. The article of manufacture of claim 52, further comprising:

computer readable program code for causing said computer to resume operation of said second processing unit if the computation does not result in an actual floating-point exception.

54. The article of manufacture of claim 52, further comprising:

computer readable program code for causing said computer to generate an interrupt signal when the computation results in an actual floating-point exception.

* * * * *

UNITED STATES PATENT AND TRADEMARK OFFICE
CERTIFICATE OF CORRECTION

PATENT NO. : 6,631,392 B1
DATED : October 7, 2003
INVENTOR(S) : Jiang et al.

It is certified that error appears in the above-identified patent and that said Letters Patent is hereby corrected as shown below:

Column 17,
Lines 15-21, please delete all of claim 38.
Line 57, please replace "party" with -- part --.

Column 18,
Lines 22-28, please delete all of claim 43.

Signed and Sealed this

Third Day of May, 2005

JON W. DUDAS
*Director of the United States Patent and Trademark Office*